United States Patent
Sepp et al.

(10) Patent No.: US 6,587,486 B1
(45) Date of Patent: Jul. 1, 2003

(54) LASER BEAM SOURCE FOR A DIRECTIONAL INFRARED COUNTERMEASURES (DIRCM) WEAPON SYSTEM

(75) Inventors: Gunther Sepp, Feldafing (DE); Rudolf Protz, Hoehenkirchen (DE)

(73) Assignee: Eads Deutschland GmbH, Munich (DE)

( * ) Notice: Subject to any disclaimer, the term of this patent is extended or adjusted under 35 U.S.C. 154(b) by 0 days.

(21) Appl. No.: 09/172,821

(22) Filed: Oct. 15, 1998

(30) Foreign Application Priority Data

Oct. 16, 1997 (DE) .......................................... 197 45 785

(51) Int. Cl.$^7$ ................................................ H01S 3/10
(52) U.S. Cl. .............................. 372/22; 372/23; 372/20
(58) Field of Search .............................. 372/23, 21, 75, 372/39, 12, 14–16, 20, 25, 29.01, 29.016, 98, 99, 100

(56) References Cited

U.S. PATENT DOCUMENTS

| | | | | |
|---|---|---|---|---|
| 5,198,607 A | * | 3/1993 | Livingston | |
| RE34,729 E | * | 9/1994 | Sipes | 372/75 |
| 5,906,053 A | * | 5/1999 | Turner | 30/347 |
| 5,912,910 A | * | 6/1999 | Sanders | 372/22 |
| H1965 H | * | 6/2001 | Burns | 372/22 |

FOREIGN PATENT DOCUMENTS

DE 4124428 8/1995

OTHER PUBLICATIONS

"FLASH—ein lasergestütztes DIRCM–System zum Selbstschutz von Flugzeugen mit optronischen Suchköpfen"; by Protz et al., pp. 16.1–16.12, Eloka Symposium, Mannheim, Germany, Oct. 16–18, 1996.

"LASER SYSTEMS FOR OPTICAL COUNTERMEASURES", by Protz et al.; Dec. 3–5, 1996, pp. 1–10, International Symposium on Optronics and Defense, Paris, Dec. 3–5, 1996.

"Nonlinear materials extend the range of high–power lasers", Infrared Materials; Laser Focus World, Jul., 1995, pp. 87–93.

"Compact Mid–Infrared Source", U. S. Army Communications–Electronic Command; Night Vision & Electronic Sensors Directorate; Dec. 18, 1995, Report NV–96–C01, 1996.

* cited by examiner

*Primary Examiner*—Paul Ip
*Assistant Examiner*—Tuan Nguyen
(74) *Attorney, Agent, or Firm*—W. F. Fasse; W. G. Fasse

(57) ABSTRACT

A laser beam source and an operating method thereof is provided for a directional infrared countermeasures (DIRCM) weapon system for defensively countering guided missiles having infrared seeking heads, by directing an infrared laser beam at the guided missile so as to disorient, saturate, or irreversibly destroy the IR detectors and circuitry arranged in the target seeking head. The power, pulse frequency and spectral composition of the laser beam is adjustable and selectable as required to adapt to any particular defensive engagement. To achieve this, the laser beam source comprises an Nd:YAG pumping laser and an optical parametric oscillator including an oscillator crystal arranged in a resonator cavity. The crystal includes a plurality of different periodically polarized crystal zones having different lattice constants. The adjacent zones can be grouped together into selectable crystal zone groups. The beam cross-section of the pumping laser beam corresponds to the cross-section of a single crystal zone or of a crystal zone group encompassing plural zones. The crystal is arranged on a slide table that is slidably displaceable by a servomotor, to move a selected crystal zone or group into the path of the pumping laser beam. Thereby the wavelength components and the relative intensities thereof of the output laser beam can easily be selectively adjusted.

26 Claims, 4 Drawing Sheets

LASER BEAM SOURCE FOR A DIRECTIONAL INFRARED COUNTERMEASURES (DIRCM) WEAPON SYSTEM

PRIORITY CLAIM

This application is based on and claims the priority under 35 U.S.C. §119 of German Patent Application 197 45 782.1, filed on Oct. 16, 1997, the entire disclosure of which is incorporated herein by reference.

FIELD OF THE INVENTION

The invention relates to a laser beam source for a directional infrared countermeasures (DIRCM) weapon system especially for use in the self-defense of an aircraft against a flying body such as a missile having an infrared (IR) seeking head.

BACKGROUND INFORMATION

The use of guided missiles for attacking aircraft, tanks, other military vehicles, and ground-based installations is well known. Such guided missiles especially include IR-seeking or heat-seeking missiles having an IR-seeking head that includes IR-sensors to seek out, locate, identify, and track the IR-signature of IR-emissions from the intended target aircraft or the like. By tracking and following the IR-emissions of the target body, the guided missile guides itself to the target body, even if the target body is moving. Such guided missiles further include semi-active missiles that seek out and track an infrared target mark that is projected by an infrared beam onto the target body. This target marking beam may be projected onto the target body by appropriate equipment provided on the guided missile itself or by equipment separate from the missile that is operated by personnel launching and directing the missile.

Various countermeasures for self-defense against such guided missiles are known. Particularly, directional infrared countermeasures (DIRCM) weapon systems are used for the self-defense of an aircraft by disorienting or disabling the guidance systems of the IR-seeking guided missiles. The countermeasures weapon systems achieve this by directing an infrared beam at the seeking head of the attacking missile, whereby the IR beam is intended to disorient or irreversibly destroy the IR detectors or associated circuitry provided in the target seeking head of the missile. In older DIRCM weapon systems, the IR beam was provided by the broad band IR radiation of IR lamps, that was bundled or collimated as well as possible into a relatively narrow directed beam. In modern DIRCM weapon systems, the IR beam is provided as a narrow band IR laser beam.

An example of such a modern DIRCM weapon system is known by the acronym FLASH, based on the German description "Flugzeug-Selbstschutz mit Laser zur Abwehr von Lenkflugkörpern mit Suchköpfen hoher Leistung", or translated into English "aircraft self-defense with laser for defense against guided missiles with seeking heads of high performance". The FLASH system uses a pulsed laser beam of variable wavelength for irreversibly destroying the seeking head or particularly the IR detectors of the seeking head of a guided missile, in order to counterattack or defend against the missile. Descriptions of the FLASH system have been published by Rudolf Protz and Gunther Sepp in "Laser Systems for Optical Countermeasures", International Symposium on optronics & Defense, Paris, Dec. 3–5, 1996, and by Rudolf Protz and D. Wittmer in "FLASH—ein Lasergestütztes DIRCM-System zum Selbstschutz von Flugzeugen gegen Flugkörper mit optronischen Suchköpfen" ("FLASH—a Laser-Supported DIRCM System for Self-Defense of Aircraft Against Missiles having Optronic Seeking Heads") in Eloka-Symposium, Mannheim,, Germany, Oct. 16–18, 1996.

Different types or classes of guided missiles typically have infrared seeking heads that operate or are sensitive in different wavelength ranges. For example, typical shoulder fired surface-to-air missiles using PbS detectors are sensitive in a wavelength range of 2 to 3 $\mu$m, and using InSb detectors are sensitive in a wavelength range of 3 to 5 $\mu$m. In contrast, anti-tank missiles typically use HgCdTe detectors and are sensitive in a wavelength range of 8 to 12 $\mu$m. Semi-active missiles, i.e. missiles using so-called target marking, use detectors that are sensitive at a wavelength of 1.06 $\mu$m. Thus, in order to be effective, the wavelength or wavelength range of the IR laser beam emitted by the DIRCM system must lie within or at least overlap the wavelength range that is transmitted through the respective seeking head optics system as well as the wavelength range in which the seeking head detectors themselves are sensitive. This requirement also pertains if the laser light reflected from the seeking head is to be analyzed for the purpose of more accurate target recognition and identification.

Suitable IR lamps or laser sources have previously not been available, especially in the wavelength range from 3 to 5 $\mu$m. In order to provide IR radiation sources also in this wavelength range, the above mentioned publications suggest using a solid state laser with a fixed wavelength, for example a wavelength of 1.06 $\mu$m for an Nd:YAG laser pumped by semiconductor laser diodes. Such a solid state laser is to be used as a pumping laser for exciting or driving optical parametric oscillators (OPOs). Such an OPO essentially comprises a nonlinear crystal arranged in an optical resonator, whereby the energy of a pumping photon is divided or distributed to two photons in the OPO. As a result, two laser beams, namely the so-called signal wave $\lambda$ and idler wave $\lambda^*$ are generated.

In the OPO, the distribution ratio of the energy to the two photons, and therewith the respective wavelengths of the two laser beams being generated are determined by various parameters, and are dependent on the index of refraction of the OPO crystal for example. For a given crystal material, the index of refraction is dependent on the crystal temperature, the orientation of the crystal relative to the direction of the pumping laser beam, and the orientation of the crystal's optical axis relative to the macroscopic OPO crystal or parallelepiped as determined when the finished crystal is being cut out of the initial crystal starting material. In this manner, dependent on the desired wavelength range, it is possible to achieve each desired wavelength within the required wavelength range by using proper crystals in respective one or two-stage OPOs. Such a method and system are described by F. Kenneth Hopkins in "Nonlinear Materials Extend the Range of High-Power Lasers" in Laser Focus World, July, 1995, for example.

Previously suggested solutions for achieving the appropriate wavelength IR emissions require the use of several different radiation sources such as lamps, or different lasers, or different OPOs and the like in order to cover the respectively necessary wavelength range or ranges. For this reason, the known systems are not economically practical in view of their complex construction and operation.

Another disadvantage of the above described manner of generating the necessary laser beam using OPOs is that generally only a single respective wavelength will be available within the desired wavelength range. Namely, a second wavelength or plural wavelengths within the desired range are not provided. In this context, the second wavelength that is always simultaneously generated by the OPO system (i.e. $\lambda$ and $\lambda^*$) is generally not suitable for DIRCM purposes due to its inappropriate wavelength and intensity. This limitation of the known systems is a serious disadvantage. Namely, if the detector type of the seeking head to be counter-attacked is unknown, for example due to inadequate target recognition and identification, then the DIRCM IR beam must contain two or more wavelengths in various ones of the above mentioned wavelength ranges to be surely and reliably effective. In other words, if it is unknown in which wavelength range the seeking head sensors are sensitive, the DIRCM system must be able to emit suitable wavelengths in all of the possibly pertinent wavelength ranges. Previously, such a second wavelength could only be generated by providing at least one respective additional OPO with its own respective pumping laser. Such measures necessarily at least double the complexity, cost and size of, the system.

Still another disadvantage of previously known laser beam sources for DIRCM weapon systems is that the emitted laser beam having a fixed wavelength is subject to relatively simple countermeasures. Namely, the fixed wavelength of the emitted laser beam can be relatively easily determined by the attacker who launched the offensive missile, or this wavelength is already generally known to the attacker. Thus, the attacker can employ simple countermeasures, such as narrow band interference filters for example, which block out this particular wavelength. As a result, all of the DIRCM weapon systems employing a laser beam at a this particular wavelength will be ineffective.

SUMMARY OF THE INVENTION

In view of the above, it is an object of the invention to provide a laser beam source of the above discussed general type, which avoids the above disadvantages and which is able to generated a laser beam having a sufficient power, pulse frequency and spectral composition (e.g. having wavelength components at $\lambda=2.0$ μm and 4.0 μm, or at $\lambda=2.1$ μm and 4.2 μm, etc.), whereby the respective spectral components are adaptively selectable to meet the requirements at hand, for successfully countering or counter attacking various attacking flying bodies and particularly guided missiles having target seeking heads using different wavelength ranges. This is to be achieved throughout a counterattack engagement process including stages of target acquisition and identification, and employing defensive measures. In this context, it should be possible to carry out the corresponding selection of the appropriate beam parameters, namely the power, pulse frequency and spectral composition of the laser beam, both directly before, as well as during the defensive combating process, being carried by the DIRCM weapon system. In this manner, it should be possible to use any additional identifying information regarding the particular seeking head type of the attacking guided missile that the DIRCM weapon system can still acquire during the attack, for advantageously fine-tuning the counter combat procedures. The invention further aims to avoid or overcome the disadvantages of the prior art, and to achieve additional advantages, as apparent from the present description. The invention further aims to provide a method for carrying out countermeasures using such a DIRCM weapon system.

The above objects have been achieved using a laser beam source for a DIRCM weapon system according to the invention, and in a method of operating such a laser beam source according to the invention, wherein the laser beam source can be set to various different wavelength ranges both for the target acquisition and identification and also for the counter-combating measures and irreversible destruction of the detectors arranged in the target seeking head of the attacking guided missile. Particularly, the power, pulse frequency and selectable spectral composition of the laser beam is adjustable to match the particular requirements at hand.

The laser beam generator arrangement according to the invention comprises a semiconductor diode pumped laser as a pumping laser in combination with an optical parametric oscillator including a non-linear crystal. The crystal preferably comprises a plurality of different periodically polarized crystal zones arranged successively adjacent one another along the crystal, whereby the crystal zones respectively have different lattice spacings or lattice constants respectively correlated to the different wavelengths that are to be produced. By moving the crystal so that a selected one of the crystal zones is positioned in alignment with the pumping laser beam, it is possible to produce the desired output wavelength of the laser beam.

A further embodiment includes a plurality of crystal zones respectively grouped together into zone groups, whereby each zone group includes plural adjacent crystal zones, and the width of the zone group substantially corresponds to the beam cross-sectional width of the pumping laser beam so that the beam simultaneously impinges on all of the zones included within the respective group. Hereby, it is possible to produce a plurality of different output wavelengths simultaneously in the output beam. In this context, the relative intensities of the different wavelengths produced in the output beam correspond to the relative widths of the individual crystal zones within the respective group.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 4:
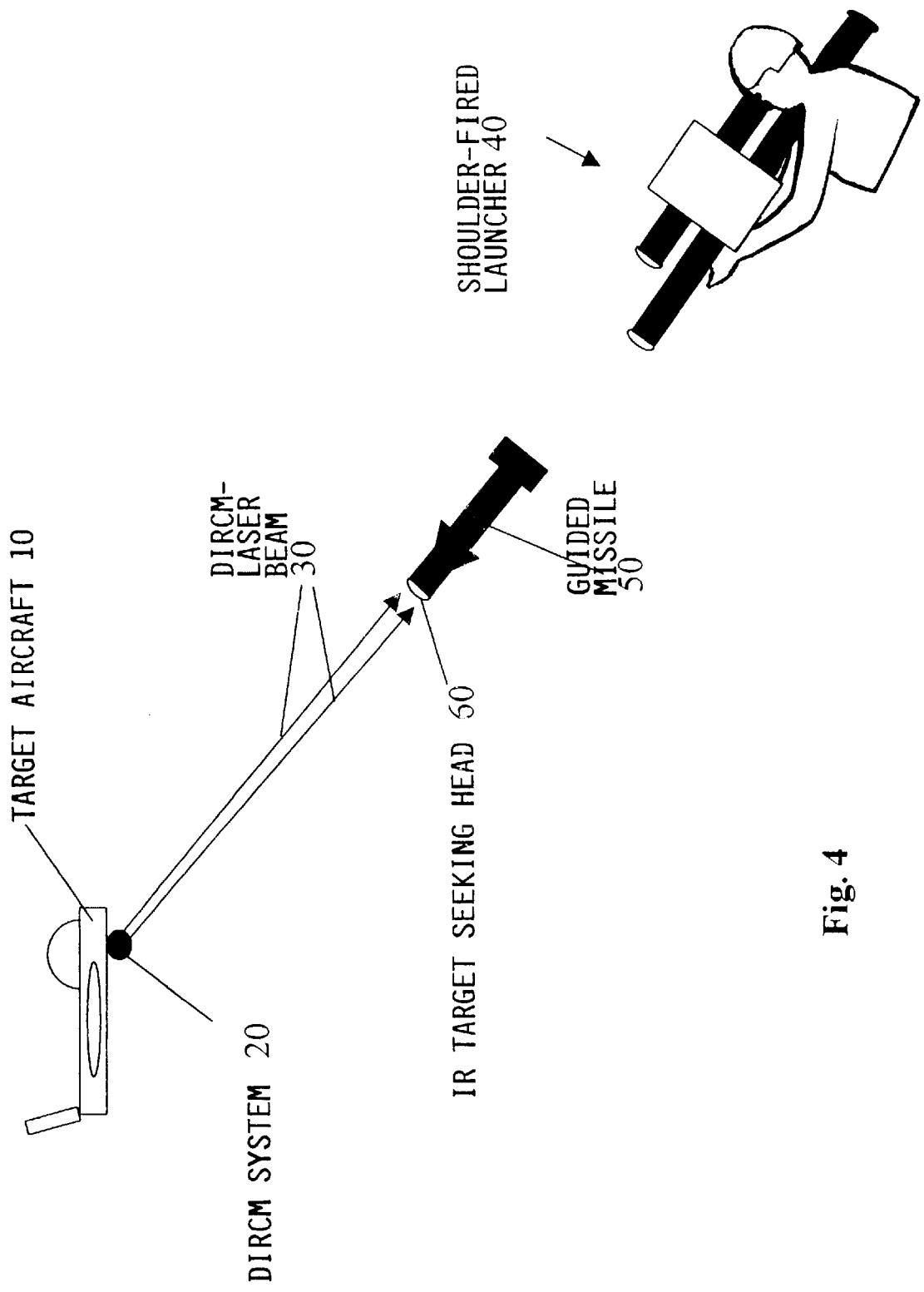
FIG. 4 is a schematic illustration of an aircraft equipped with a DIRCM weapon system according to the invention for countering a guided missile having an autonomous IR target-seeking head.

FIG. 4 schematically illustrates a representative application or situation in which the present invention can be used.

A guided missile 50 having an IR target seeking head 60 has been fired at a target aircraft 10 from a shoulder-supported launcher or firing station 40 carried by a soldier. Infrared detectors in the IR target-seeking head 60 of the missile 50 are intended to detect and track the engine heat of the target aircraft 10, and thereby guide the missile 50 into impact with the aircraft 10. The target aircraft 10, however, is equipped with a DIRCM weapon system 20 including a laser beam source according to the present invention, as well as circuits and devices for target acquisition, recognition and tracking, as well as devices for directing the laser beam emitted by the inventive beam source.

The DIRCM weapon system 20 detects the incoming guided missile 50, and uses the laser source according to the invention to generate a suitable DIRCM laser beam 30 and then directs the beam 30 at the IR target-seeking head 60 of the missile 50. Thereby, the laser beam 30 serves to disorient, saturate, or even irreparably destroy the IR seeking head 60, namely the IR detectors or the associated circuitry therein. As a result, the guided missile 50 loses its guidance ability, and the aircraft 10 easily avoids the missile 50.

In order to improve the effectiveness of the laser countermeasures provided by the DIRCM weapon system, the invention provides a laser beam generator or source 100 for such a DIRCM weapon system 20, which is able to generate a laser beam 30 operating in different wavelength ranges both for the target acquisition and identification as well as for combating and irreversibly destroying the IR detectors arranged in the target seeking head 60 of the missile 50. To achieve this, the power, pulse frequency, and spectral composition of the laser beam 30 is adjustable or selectable to match the particular requirements of each missile attack engagement, so as to provide optimum effectiveness of the laser countermeasures for a range of different attacking missiles under different conditions.

Figure 1:
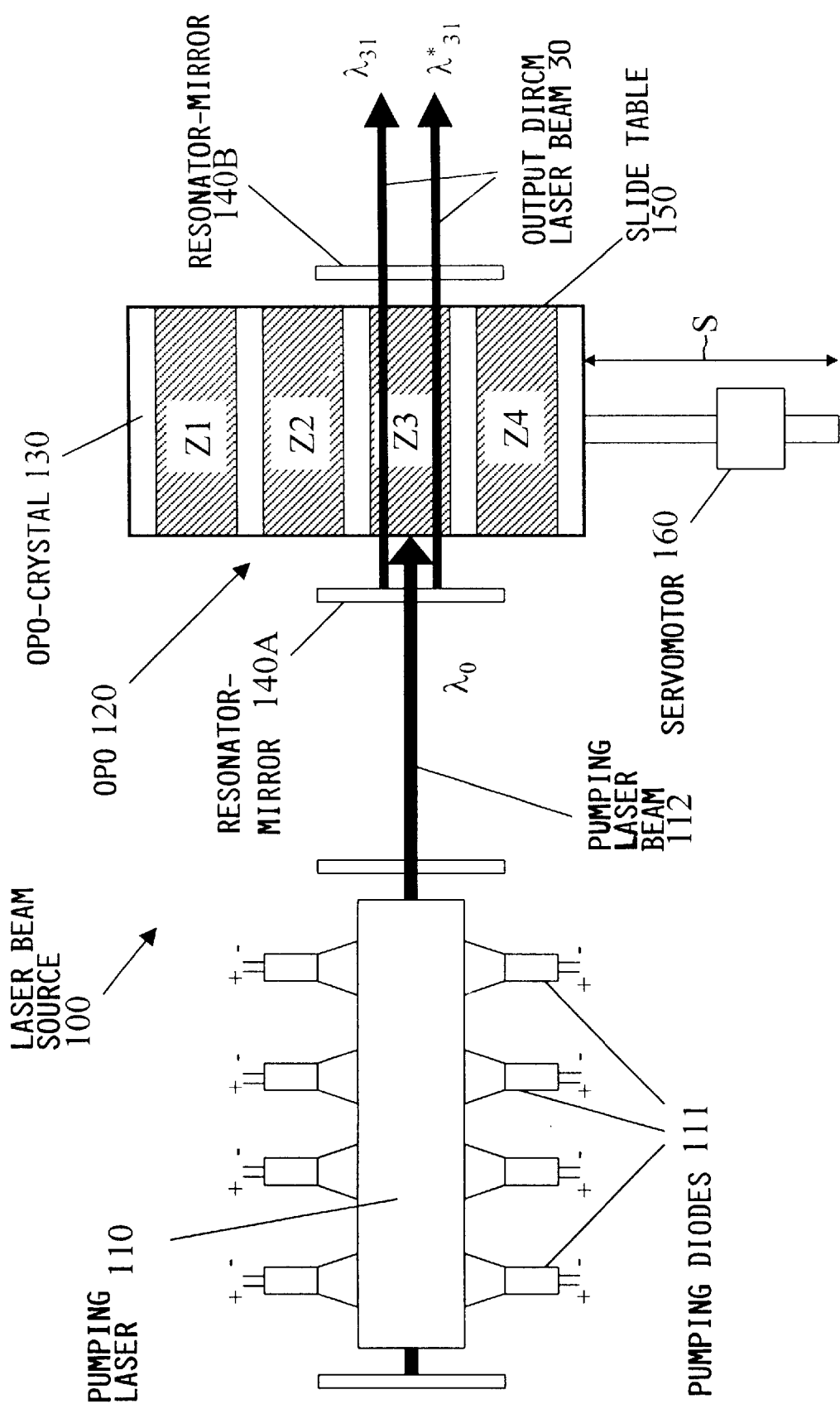
FIG. 1 is a schematic block diagram of the basic construction of a first embodiment of a laser beam source for a DIRCM laser weapon system according to the invention, including a pumping laser and a selectively adjustable optical parametric oscillator having four different crystal zones for generating four respective different signal waves and idler waves.

FIG. 1 schematically illustrates an example embodiment of such a laser beam source 100, comprising a pumping laser 110, which is here specifically embodied as an Nd:YAG laser pumped by laser diodes 111, to produce a primary or initial pumping laser beam 112. The laser beam source 100 further comprises an optical parametric oscillator 120 comprising a crystal 130, for example a lithium niobate crystal, arranged between an input resonator mirror 140A and an output resonator mirror 140B, in the path of the pumping laser beam 112. In its simplest form as schematically illustrated in FIG. 1, this crystal 130 comprises a plurality of different periodically polarized (pp) zones Z1, Z2, Z3, and Z4 each having the same width, arranged successively adjacent one another along the length of the crystal. The crystal 130 may be a single monolithic crystal or may be made up of a plurality of individual crystal bodies that each respectively represent one of the crystal zones Z1, Z2, Z3, or Z4. The respective periodically polarized zones Z1, Z2, Z3 and Z4 have different lattice spacings or lattice constants 133A, 133B, 133C and 133D respectively, which are correlated to the laser output wavelengths that are to be generated. In this regard, see FIG. 3, where the lattice constants 133A, 133B, and 133C are schematically represented.

When the pumping laser beam 112 is introduced into a particular crystal zone (e.g. Z3) of the crystal 130 in the optical parametric oscillator 120, the optically pumped resonance between the mirrors 140A and 140B generates an output laser beam 30 having a wavelength component corresponding to the respective lattice constant (e.g. 133C) of the crystal zone (e.g. Z3) that is respectively in the path of the laser beam within the oscillator 120 at the time. Specifically, the output laser beam 30 includes a signal wave $\lambda$ and an idler wave $\lambda^*$. The spectral composition of the output beam 30 may thus be adjusted or selected by moving the crystal in the sliding direction S, so as to place into the path of the pumping laser beam 112 a selected one of the crystal zones having the appropriate lattice constant correlated to the selected wavelength.

As further schematically represented in FIG. 1, the crystal 130 is mounted on a slidably displaceable slide table 150, which can be slidingly displaced in the direction S by a servomotor 160. By appropriately actuating the servomotor 160, a selected one of the crystal zones Z1, Z2, Z3 or Z4 can be moved into the path of the pumping laser beam 112. Thereby the respective output wavelength of the signal wave $\lambda$ and the idler wave $\lambda^*$ included in the output laser beam 30 can be selected as desired, dependent on the respective lattice constant 133A, 133B, 133C or 133D of the respective crystal zone Z1, Z2, Z3 or 132D that is placed into the operative position in the path of the input beam 112 at any time.

An alternative arrangement can use a circular arc-shaped or full-circle support on which the crystal is arranged, instead of the planar slide table 150. In this case the servomotor could selectively rotate the support to place the selected crystal zone into the beam path of the pumping laser beam. In other words, the linear translational sliding arrangement shown in FIG. 1 is just one possible embodiment for moving the crystal 130.

The beam cross-section of the input laser beam 112 having an incident wavelength $\lambda_0$ is preferably substantially rectangular or in other words matched to the shape or crystal geometry of the respective crystal zones, in this embodiment. Also, the beam width is substantially equal to or substantially corresponds to the width of each crystal zone in the direction S. Thereby, the pumping beam 112 impinges on only a single selected zone at a time, and efficiently irradiates onto substantially the entire cross-section of the selected zone. The term "substantially equal" thus means that the beam width is not significantly greater than the zone width so as to generate a significant intensity of another wavelength and is not significantly less than the zone width so as to be inefficient in irradiating into the crystal. A practical guideline would be that the beam width is not more than 5% greater than the zone width and not more than 10% less than the zone width.

Alternatively, the crystal 130 may be moved to an intermediated position, in which the pumping beam 112 overlaps onto two adjacent ones of the crystal zones. Thereby, two different output wavelength components can be simultaneously generated in the output beam 30, with the relative intensity of the two different wavelength components dependent on the proportional overlap of the pumping beam 112 onto the two respective crystal zones.

The crystal 130 having the differentiated crystal zones Z1, Z2, Z3 and Z4 can be produced and embodied in a lithium niobate crystal as described in the report entitled "Compact Mid-Infrared Source" by W. Bosenberg of the U.S. Army Communications Electronics Command, Report NV-96-C01, 1996. As an example, a crystal with crystal zones Z1, Z2, Z3 and Z4 having respective lattice constants 133A, 133B, 133C, and 133D respectively varying in the range from 32 to 26 $\mu$m, will respectively generate a correlated output beam comprising a signal wave $\lambda$ having a wavelength varying in therange from 2 to 5 $\mu$m.

In the embodiment of FIG. 1 as described above, the beam cross-section of the pumping laser beam 112 corresponds to the width of each crystal zone, e.g. a single crystal zone Z3, whereby this crystal zone has a uniform lattice constant 133C across its entire width. In contrast thereto, the further embodiment according to FIG. 2 comprises a crystal 130 in which plural crystal zones Z1, Z2 and Z3 arranged adjacent one another are respectively grouped together to form a plurality of adjacent crystal zone groups G1, G2, G3 and G4 of respectively equal width arranged next to each other along the length of the crystal 130. The widths of the periodically polarized crystal zones Z1, Z2 and Z3 within each group are different from one another. In the example shown in FIG. 2, the crystal 130 comprises four groups G1, G2, G3 and G4, which each respectively comprise three crystal zones, for a total of twelve crystal zones among the four groups in the crystal 130.

Figure 2:
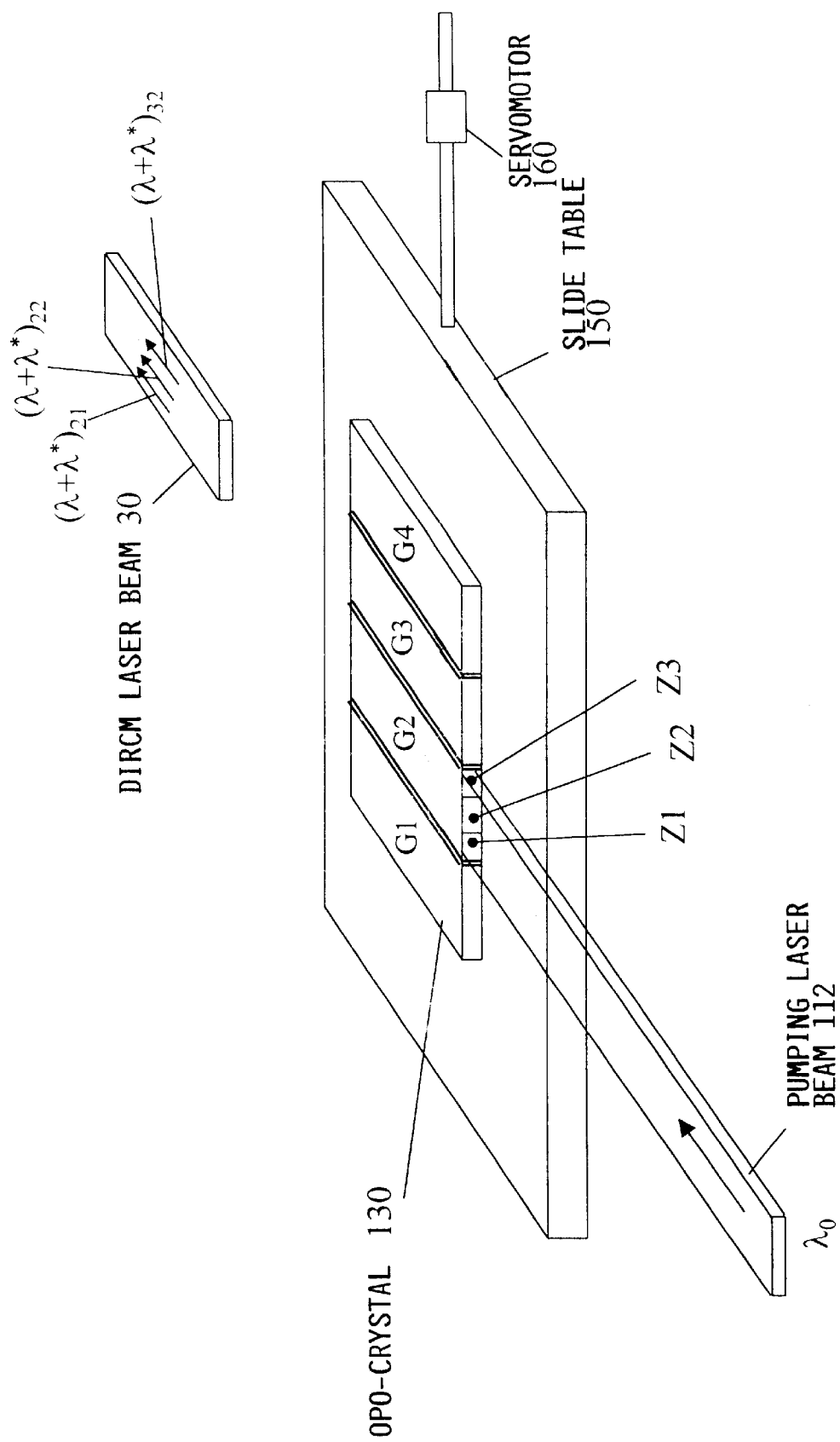
FIG. 2 is an enlarged schematic perspective view of an optical parametric oscillator crystal having four groups of three respective different crystal zones for generating four different output beams respectively made up of different combinations of respectively three different signal and idler waves.

In this embodiment of FIG. 2, the beam cross-section of the pumping laser beam 112 corresponds to the cross-sectional size and particularly the width of an entire group G, and thus spans across and encompasses the three crystal zones included in the respective group. Thus, in the example shown in FIG. 2, the second group G2 has been slidingly moved into alignment with the pumping laser beam 112, whereby the beam cross-section or beam width encompasses and impinges on all three crystal zones Z1, Z2 and Z3 included in the second group G2. Since the three operative crystal zones Z1, Z2 and Z3 respectively have three different lattice constants 133A, 133B and 133C that are all positioned within the laser beam path, as a result the output laser beam 30 will simultaneously comprise three different spectral components, each including signal and idler waves $\lambda$ and $\lambda^*$ represented by $(\lambda+\lambda^*)_{21}$, $(\lambda+\lambda^*)_{22}$ and $(\lambda+\lambda^*)_{23}$ in FIG. 2. The subscripts 21, 22 and 23, or generally GZ identifying the wavelength components respectively identify the group and zone from which the respective component was generated. For example, $(\lambda+\lambda^*)_{23}$ identifies the wavelength component generated by the third zone Z3 within the second group G2.

In the present embodiment of FIG. 2, just as in the embodiment of FIG. 1, the selection of the wavelength composition of the output laser beam 30 to have the desired output wavelength components $(\lambda+\lambda^*)_{GZ}$ is achieved by appropriately displacing the crystal 130 so as to place the proper group of crystal zones into the beam path of the pumping laser beam 112. Since different crystal zones having different lattice constants can be combined in any desired combination in each respective group when producing the crystal 130, the selection of different combinations of wavelength components within the output laser beam 30 is essentially unlimited, and at the time of operating the laser beam source it is a simple matter to select the proper group providing a the desired wavelength combination from among the available groups provided on the crystal 130.

Figure 3:
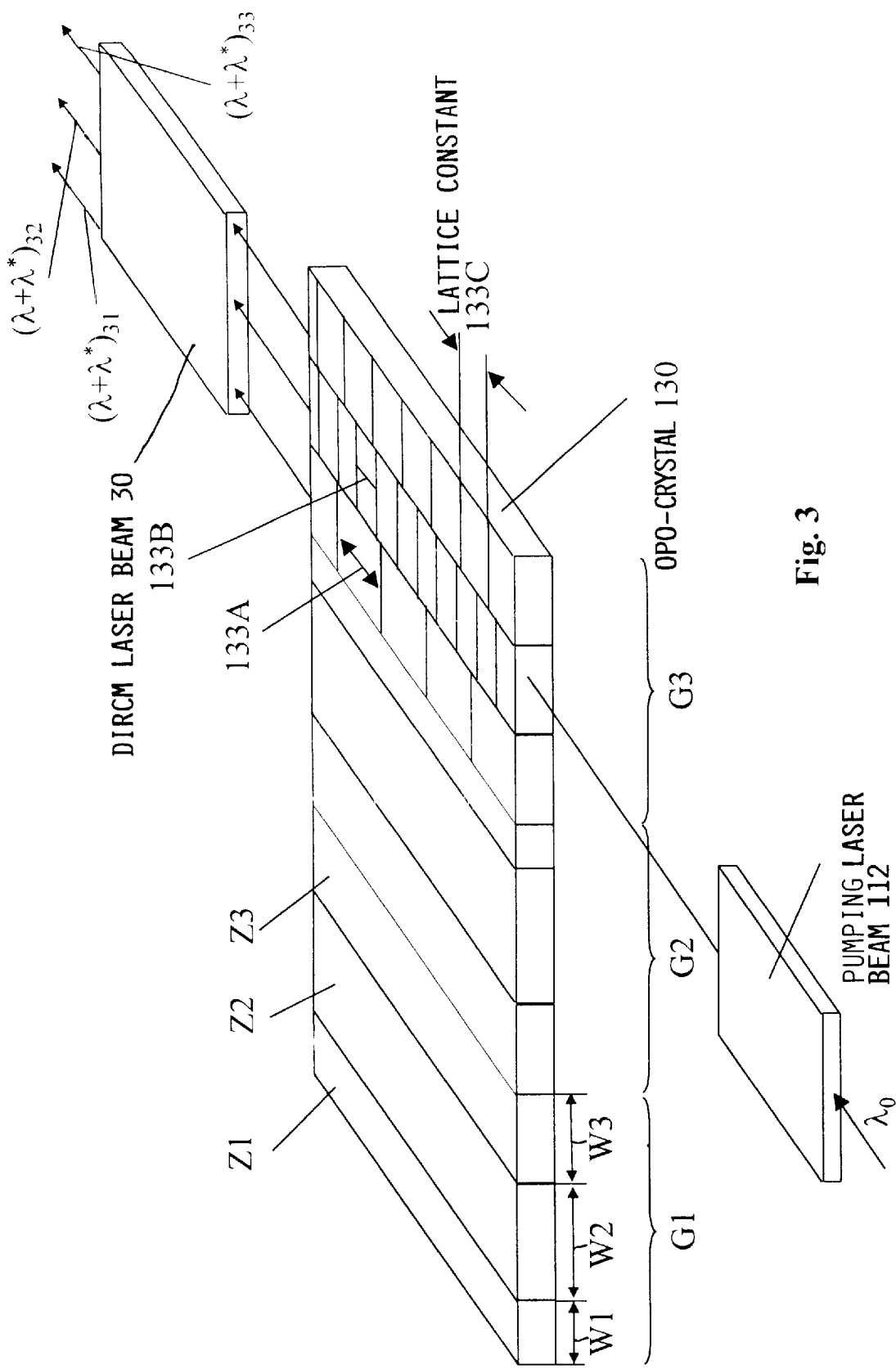
FIG. 3 is an enlarged schematic perspective view of an optical parametric oscillator crystal having three groups of respectively three different crystal zones for generating different wavelengths, whereby the relative intensities of the different generated wavelengths are determined by the different relative widths of the respective crystal zones within the respective crystal zone group.

According to a further feature of the invention, the relative intensities of the different wavelength components making up the output laser beam 30 can also be selected. Namely, since the intensity of each wavelength component at least approximately corresponds to the relative width of the respective crystal zone Z generating that particular wavelength component within a particular crystal zone group G, it is simply necessary to produce the crystal zones Z having the respectively desired relative widths within each given crystal zone group G so as to achieve the desired relative intensities of the wavelength components $(\lambda+\lambda^*)_{GZ}$. Thus, at least some of the groups G provided in the crystal 130 may include the same three crystal zone types having the same respective lattice constants, for example, but having different widths relative to each other. FIG. 3 schematically represents such an embodiment in which three zones Z1, Z2 and Z3 are included in each of three groups G1, G2 and G3, whereby the relative widths $W_1$, $W_2$ and $W_3$ of the three zones differ in the three groups. When at least two zones are included in one group, the width W of the widest zone will be less than 75% or even less than 50% of the beam width, for example.

Moreover, the emitted pulse frequency of the output laser beam 30 can be adjusted or selected in a simple manner by correspondingly controlling the actuation of the pumping laser diodes 111 of the diode-pumped Nd:YAG pumping laser 110. Similarly, the output power of the output laser beam 30 is influenced by the input power of the pumping laser beam 112, so that the output power can be controlled by controlling the input power. The relative power or relative intensity of the different wavelength components is controlled based on the different relative widths of the crystal zones as described above. Thus, the invention provides a laser beam source 100 having a laser beam 30 of which the power, pulse frequency, and selectively adjustable spectral composition can be adjusted and adapted to the requirements in any situation.

The following Table lists the wavelength components and their relative intensities as respectively generated by three crystal zones included in each one of four groups, in a representative example of an advantageous DIRCM laser beam source.

| WAVELENGTH COMPONENTS AND RELATIVE INTENSITIES IN OUTPUT BEAM GENERATED BY SELECTED CRYSTAL ZONE GROUP | | | |
| --- | --- | --- | --- |
| DIRCM WAVELENGTH RANGE GROUP | 2 to 3 μm | 3 to 5 μm | 3 to 5 μm |
| | WAVELENGTH, RELATIVE INTENSITY | | |
| G1 | 2.5 μm, 10% | 3.2 μm, 60% | 4.1 μm, 30% |
| G2 | 2.7 μm, 20% | 3.6 μm, 50% | 4.5 μm, 30% |
| G3 | 2.4 μm, 40% | 3.9 μm, 50% | 4.3 μm, 10% |
| G4 | 2.6 μm, 50% | 4.1 μm, 30% | 4.4 μm, 20% |

In this application for aircraft self-defense against surface-to-air missiles, it is desirable to provide wavelength components in the output laser beam 30 in the range of 2 to 3 μm and in the range of 3 to 5 μm. The above described inventive arrangement can thus provide four different selectable beam wavelength combinations, wherein each combination includes different proportions or intensities of one wavelength in the range from 2 to 3 μm and two different wavelengths in the range from 3 to 5 μm. Thus, for example, when the crystal 130 is moved so as to place the first group G1 into operation, the three respective associated crystal zones will produce an output beam including 10% of the intensity at a wavelength of 2.5 μm, 60% of the intensity at a wavelength of 3.2 μm, and 30% of the intensity at a wavelength of 4.1 μm.

The selection and design of the available spectral compositions by appropriate design of the crystal 130, as well as the selection of the most appropriate spectral composition of the output laser beam 30 in any particular actuation of the countermeasure system will respectively be based on the available information regarding the guided missile 50 that is to be counterattacked. Such identifying information is available a priori based on the total available range of attacking missiles, and is also determined in the particular tactical situation by means of sensors and the like included in the DIRCM weapon system 20.

As discussed above, FIGS. 1 and 2 illustrate one technical possibility for enabling the displacement of the crystal 130 to move the selected crystal zone Z or group G into the path of the laser beam 112. The embodiment using a servomotor 160 connected to a slide table 150 is particularly simple and achieves a rapid reliable positioning of the crystal 130. Moreover, this arrangement of a translational sliding mechanism is unaffected by, i.e. is non-critical relative to, the orientation of the crystal 130 with respect to the orientation of the pumping laser beam 112. In comparison, other possible methods of moving the crystal 130 are clearly inferior. Even if only a single wavelength is respectively to be generated, this could be achieved only in a much less flexible manner using the typical optical parametric oscillator arrangements. For example, this could be achieved by means of the above mentioned dependence of the wavelength on the index of refraction of the oscillator crystal. Namely, this could be achieved over a larger wavelength range by appropriately orienting the optical axis of the crystal while fabricating the macroscopic oscillator crystal parallelepiped that is cut from the original crystalline material, but in such a case the angular orientation and the index of refraction is thereby set to a fixed value. Alternatively, this could be achieved over a smaller wavelength range during operation, by adjusting the crystal temperature, but such a method is very slow and error prone in practice. As another alternative, this effect could be achieved by tilting or tipping the crystal 130 in the resonator formed between the resonator mirrors 140A and 140B, relative to the axial direction of the pumping laser beam 112. However, such an adjustment or variation of the resonator setting is considerably more difficult to achieve and more error prone than the inventive sliding displacement of the oscillator crystal 130 having different crystal zones within a fixed resonator.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A laser beam source arrangement comprising:
a single pumping laser for emitting a single pumping laser beam having a laser beam cross-section width along a beam path;
optical parametric oscillator means for receiving said single pumping laser beam and for selectively simultaneously emitting plural output beams respectively a having different wavelengths, wherein said optical parametric oscillator means include an optical parametric oscillator crystal that is arranged on said beam path to be impinged on by said single pumping laser beam, wherein said optical parametric oscillator crystal includes plural adjacent crystal zone groups that each respectively include plural adjacent crystal zones that are respectively for emitting respective ones of said output beams respectively having said different wavelengths, and wherein each one of said crystal zone groups has a width substantially corresponding to said laser beam cross-section width of said pumping laser beam so that said pumping laser beam simultaneously irradiates all of said crystal zones of a respective selected one of said crystal zone groups; and
means for selectively changing a relative alignment of said pumping laser beam and said optical parametric oscillator crystal, for selectively impinging said pumping laser beam onto any selected one of said crystal zone groups of said optical parametric oscillator crystal.

2. A laser beam source arrangement comprising:
a pumping laser beam source emitting a single monochromatic pumping laser beam along a beam path, wherein said pumping laser beam has a first cross-sectional dimension orthogonal to said beam path; and
an optical parametric oscillator including an oscillator crystal;
wherein said oscillator crystal includes plural crystal zone groups;
wherein each one of said crystal zone groups respectively has a second cross-sectional dimension substantially corresponding to said first cross-sectional dimension of said pumping laser beam;
wherein each one of said crystal zone groups respectively includes plural crystal zones that are respectively differently periodically polarized relative to each other and that respectively have different lattice constants relative to each other; and
wherein said oscillator crystal is arranged in said beam path such that said pumping laser beam impinges on all of said crystal zones of a respective selected one of said crystal zone groups positioned in said beam path such that said optical parametric oscillator simultaneously emits plural output laser beams that respectively have different output wavelengths relative to each other and that are respectively emitted by said plural crystal zones of said selected one of said crystal zone groups.

3. The laser beam source arrangement according to claim 2,
wherein said output wavelengths are respectively correlated to said different lattice constants of said crystal zones of said selected one of said crystal zone groups,
wherein said lattice constants of said plural crystal zones of all of said crystal zone groups are respectively correlated to a plurality of available wavelengths, and
wherein said output wavelengths can be selected among said plurality of available wavelengths by selectively positioning said oscillator crystal and said pumping laser beam relative to each other so that said laser beam impinges on said respective selected one of said crystal zone groups that includes said crystal zones having said lattice constants correlated with selected ones of said available wavelengths.

4. The laser beam source arrangement according to claim 2, as a component of a directional infrared countermeasures system for countering a guided missile including an infrared seeking sensor system, wherein said output laser beams emitted by said optical parametric oscillator have a power and wavelength to disable the infrared seeking sensor system of the guided missile.

5. The laser beam source arrangement according to claim 2, wherein said pumping laser beam source comprises a diode-pumped Nd:YAG laser.

6. The laser beam source arrangement according to claim 5, wherein said oscillator crystal comprises a periodically polarized lithium-niobate crystal incorporating said plural crystal zone groups of said plural crystal zones.

7. The laser beam source arrangement according to claim 2, wherein said oscillator crystal is arranged to be translationally slidable along a sliding direction within said optical parametric oscillator.

8. The laser beam source arrangement according to claim 7, further comprising a translationally slidable slide table arranged in said optical parametric oscillator, and a servomotor coupled to said slide table and adapted to selectively translationally slide said slide table back and forth along said sliding direction to any selected one of a plurality of selectable positions in said optical parametric oscillator, and wherein said oscillator crystal is arranged on said slide table so as to be translationally slidable therewith in said optical parametric oscillator.

9. The laser beam source arrangement according to claim 7, wherein said plurality of crystal zones are arranged adjacent to one another along said sliding direction, which is perpendicular to said beam path.

10. The laser beam source arrangement according to claim 9, wherein said oscillator crystal and each of said crystal zones thereof respectively have a rectangular cross-section on a section plane parallel to said sliding direction.

11. The laser beam source arrangement according to claim 10, wherein said pumping laser beam source is so configured and adapted that said pumping laser beam has a rectangular cross-section.

12. The laser beam source arrangement according to claim 9, wherein said different lattice constants of said plural crystal zones are respectively correlated to a plurality of available wavelengths, and wherein said output wavelengths are selected among said available wavelengths by translationally sliding said oscillator crystal to position said selected one of said crystal zone groups into said beam path of said pumping laser beam.

13. The laser beam source arrangement according to claim 9, wherein said first cross-sectional dimension of said pumping laser beam is a beam width of said pumping laser beam in said sliding direction, said second cross-sectional dimension of each one of said crystal zone groups is a group width in said sliding direction, and each one of said crystal zones has a respective zone width in said sliding direction that is less than said beam width of said pumping laser beam in said sliding direction.

14. The laser beam source arrangement according to claim 13, wherein said respective zone widths of said crystal zones, relative to each other, in a respective one of said crystal zone groups correspond respectively to relative output intensities of said output laser beams respectively having said different output wavelengths.

15. The laser beam source arrangement according to claim 14, wherein said crystal zone groups respectively include different combinations of said crystal zones having different ones of said zone widths so as to provide different selectable combinations of said relative output intensities.

16. The laser beam source arrangement according to claim 2, wherein said oscillator crystal is arranged to be movable relative to said beam path along a moving direction within said optical parametric oscillator, wherein said crystal zones are arranged adjacent to one another along said moving direction, wherein said second cross-sectional dimension of each one of said crystal zones is a zone width in said moving direction, and wherein said first cross-sectional dimension of said pumping laser beam is a beam width of said pumping laser beam in said moving direction.

17. The laser beam source arrangement according to claim 2, wherein said different output wavelengths simultaneously include at least one first output wavelength in a range from 2 to 3 $\mu$m and at least one second output wavelength in a range from 3 to 5 $\mu$m.

18. A method of generating a laser beam using a pumping laser beam source and an optical parametric oscillator including an oscillator crystal, said method comprising the following steps:

a) generating a single monochromatic pumping laser beam and directing said pumping laser beam along a beam path using said pumping laser beam source;

b) impinging said pumping laser beam onto said oscillator so as to energize said oscillator and cause said oscillator to emit an output laser beam; and c) causing a relative movement between said oscillator crystal and said beam path so that a selected portion of said oscillator crystal is intersected by said beam path thereby varying an output wavelength composition of said output laser beam;

wherein said oscillator crystal includes a plurality of differently periodically polarized crystal zones is respectively having different lattice constants, and wherein said step c) is carried out so that a selected plurality of said crystal zones are simultaneously intersected by said beam path and impinged on by said pumping laser beam, and said output wavelength composition of said output laser beam consists of a selected plurality of different wavelength components respectively correlated to said respective lattice constants of said selected plurality of said crystal zones.

19. The method according to claim 18, wherein said causing of said relative movement in said step c) comprises translationally moving said oscillator crystal relative to said beam path in a direction perpendicular to said beam path.

20. The method according to claim 18, wherein at least some of said crystal zones respectively have different widths in a direction perpendicular to said beam path, and wherein said step c) is carried out so that said selected plurality of said crystal zones includes respective crystal zones having said different widths, and said plurality of different wavelength components respectively have different energy intensities in said output laser beam respectively proportional to said different widths of said selected plurality of said crystal zones.

21. The method according to claim 18, further comprising a preliminary step of determining an optimum wavelength composition that said output laser beam is to have, and wherein said step c) is carried out so that said output wavelength composition most closely matches said optimum wavelength composition among a plurality of available ones of said output wavelength compositions.

22. The method according to claim 18, further comprising a step of varying a pulse frequency of said output laser beam, and a step of varying an output power of said output laser beam.

23. A laser beam source arrangement comprising:

an optical parametric oscillator crystal comprising a plurality of crystal zones that respectively have different crystal lattice constants;

pumping laser means for emitting a single laser beam having a single laser beam wavelength and having a beam width, and for impinging said laser beam onto said crystal so that said laser beam impinges on and irradiates plural adjacent ones of said crystal zones simultaneously, wherein said beam width corresponds to a cumulative total width of said plural adjacent ones of said crystal zones; and a drive mechanism connected to said crystal to move said crystal transversely relative to said laser beam.

24. A laser beam source arrangement comprising:

an optical parametric oscillator crystal comprising a plurality of crystal zones that respectively have different crystal lattice constants; and a pumping laser source that emits a monochromatic laser beam along a beam path, and that has a beam width corresponding to a cumulative total width of plural adjacent ones of said crystal zones;

wherein said crystal is arranged on said beam path.

25. The laser beam source arrangement according to claim 24, wherein said plural adjacent ones of said crystal zones respectively have different zone widths, which sum together to equal said beam width.

26. A method of operating said laser beam source arrangement according to claim 24, comprising the steps:

a) emitting said monochromatic laser beam along said beam path from said pumping laser source;

b) impinging said laser beam onto said crystal so as to simultaneously irradiate said plural adjacent crystal zones and establish an optically pumped resonance in each one of said plural adjacent crystal zones; and c) as a result of said optically pumped resonance, simultaneously emitting from said plural adjacent crystal zones respective output beams having respective different output beam wavelengths in accordance with said different crystal lattice constants.

* * * * *